No. 785,298. PATENTED MAR. 21, 1905.
I. FOX.
EYEGLASS MOUNTING.
APPLICATION FILED AUG. 8, 1904.
*Fig. I*
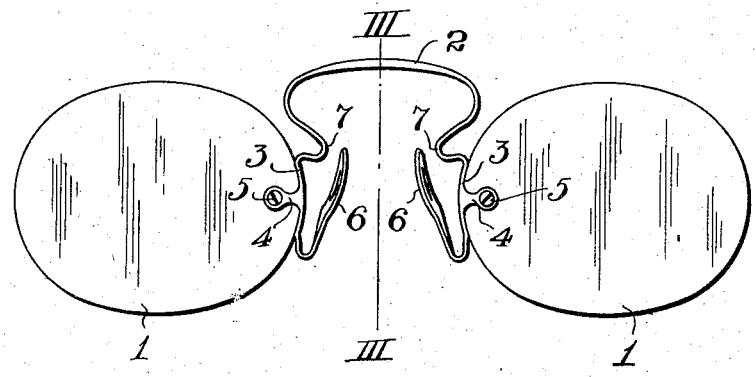
*Fig. II*
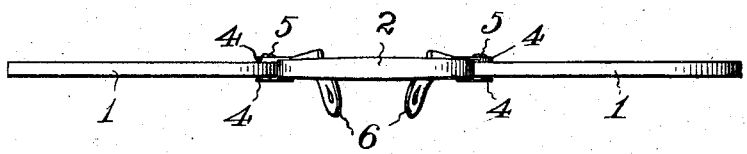
*Fig. III*
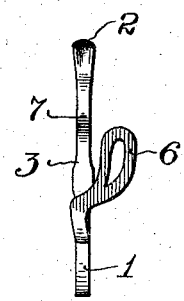
WITNESSES:
INVENTOR
Ivan Fox
BY
ATTORNEY.

No. 785,298. Patented March 21, 1905.

UNITED STATES PATENT OFFICE.

IVAN FOX, OF PHILADELPHIA, PENNSYLVANIA, ASSIGNOR TO FOX OPTICAL MANUFACTURING COMPANY, OF PHILADELPHIA, PENNSYLVANIA, A CORPORATION OF NEW JERSEY.

EYEGLASS-MOUNTING.

SPECIFICATION forming part of Letters Patent No. 785,298, dated March 21, 1905.

Application filed August 8, 1904. Serial No. 219,837.

*To all whom it may concern:*

Be it known that I, IVAN FOX, a citizen of the United States, residing in the city of Philadelphia, in the county of Philadelphia and State of Pennsylvania, have invented certain new and useful Improvements in Eyeglass-Mountings, of which the following is a specification.

This invention relates to an improvement in eye glass mountings in which the bow spring, the portions which I term legs and which are located opposite the inner edges of the lenses, and the nose pieces are integral.

The specific improvement consists in providing loops intermediate the said leg portions and the respective ends of the bow spring, and by means of which the bow spring and leg portions of the mounting are connected to each other, whereby the said leg portions may be in the plane of the bow spring and at the same time be secured readily to the lenses of a pair of eye glasses.

My invention resides in the novel features of construction as hereinafter described in detail in the specification, as set forth specifically in the claims, and as illustrated in the accompanying drawings, in which, Figure I is a front elevation of a pair of eye glasses provided with my improvement; Figure II is a top plan view thereof; and, Figure III is a section on the line III-III of Figure I.

Referring to the drawings, 1 designates the lenses of a pair of eye glasses, and 2 designates a bow spring, the said spring being curvilinear in transverse section, as illustrated in Figure III.

3 designates what I term the leg portions of the eye glass mounting, which are provided with the clasps 4 which extend upon opposite sides of the eye glass lenses at the inner edges thereof, and which are provided with perforations for the reception of the screws 5 by means of which the mounting is secured to the lenses.

6 designates the nose pieces or nose guards which are integral with and are continuous of the leg portions 3.

Intermediate the leg portions 3 and the bow spring 2, I have provided loops 7, as very clearly illustrated in Figure I of the drawings. The presence of these loops prevents the upper portions of the legs 3 from being pulled away from the edges of the eye glass lenses. The portions of the mounting constituting the limbs of the loops are arranged in a plane which is substantially at a right angle to a line which is perpendicular to the plane of the lenses of a pair of eye glasses. By moving or adjusting the limbs of the loops toward or from each other, the lenses of the eye glasses are adjusted vertically in front of the eyes. It is also to be noted that the presence of these loops enables or permits a construction in which the legs 3 are in the same plane as that of the bow spring 2 and the eye glass lenses 1.

If the loops 7 were not present, there would always be danger of cracking or breaking the lenses in separating them for the purpose of placing the glasses upon the nose, by reason of the leverage of the legs 3 upon the said lenses; but the presence of these loops decreases the strain to such an extent that this danger is obviated.

It will be understood that changes may be made in the construction illustrated without departing from the scope of my invention, and I do not, therefore, desire to be limited to the exact construction shown.

Having thus described my invention, I claim—

1. In eye glasses, the combination of the lenses and a one piece eye glass mounting, the said mounting consisting of a bow spring, legs, and nose pieces, and being provided with loops intermediate the opposite ends of the said bow spring and the said legs, the limbs of the said loops occupying a plane which is substantially at a right angle to a line which is perpendicular to the plane of the lenses.

2. A one piece eye glass mounting comprising a bow spring, legs which are adapted to engage the inner edges of the lenses of a pair of eye glasses, nose pieces which are integral with the said legs, and loops connecting the opposite ends of the said bow spring and the said legs.

3. A one piece eye glass mounting comprising nose pieces, legs, clasps integral with the said legs and located upon opposite sides of the lenses for the purpose of securing the said mounting to the said lenses, a bow spring, and inwardly extending loops intermediate the said legs and the opposite ends of the said bow spring and forming connections between the said legs and the said bow spring.

4. In eye glasses, the combination of the lenses and a one piece eye glass mounting, consisting of a bow spring, legs and nose pieces, the said lenses, bow spring and legs being in the same plane, and the said mounting being provided with loops intermediate the opposite ends of the said bow spring and the said legs.

In testimony that I claim the foregoing as my invention I have hereunto signed my name this 6th day of August, A. D. 1904.

IVAN FOX.

In presence of—
 S. SALOME BROOKE,
 THOS. K. LANCASTER.